Oct. 23, 1962 G. A. VISSER ETAL 3,059,281
METHOD OF MAKING A REINFORCED ARTICLE HAVING
AN INTERNAL INTEGRAL CONFIGURATION
Filed April 18, 1960 3 Sheets-Sheet 1

INVENTORS
GERRIT A. VISSER
PAUL V. BOLLENBACHER
BY
Jack W. Hicks
ATTORNEY

INVENTORS
GERRIT A. VISSER
PAUL V. BOLLENBACHER
BY

ATTORNEY

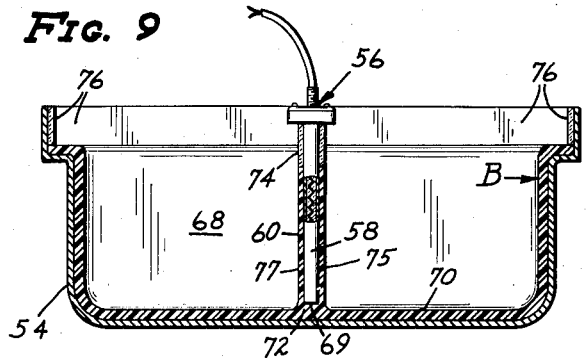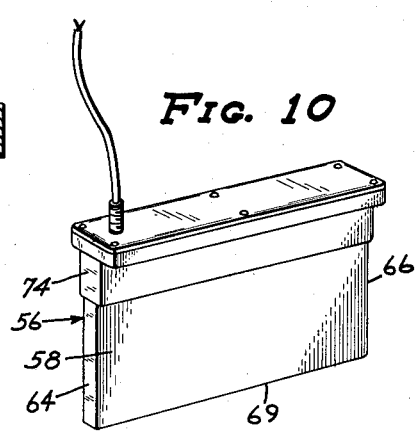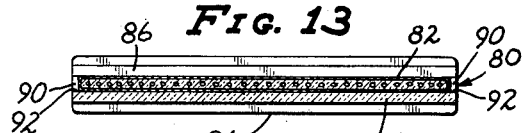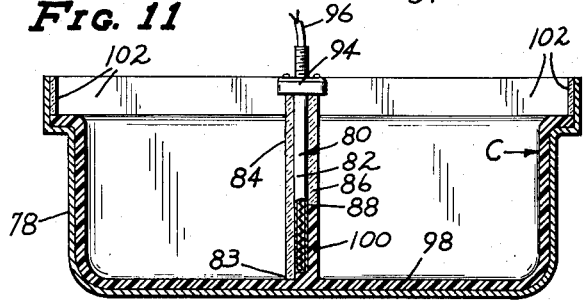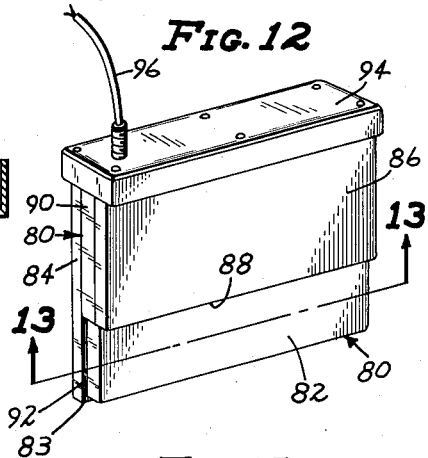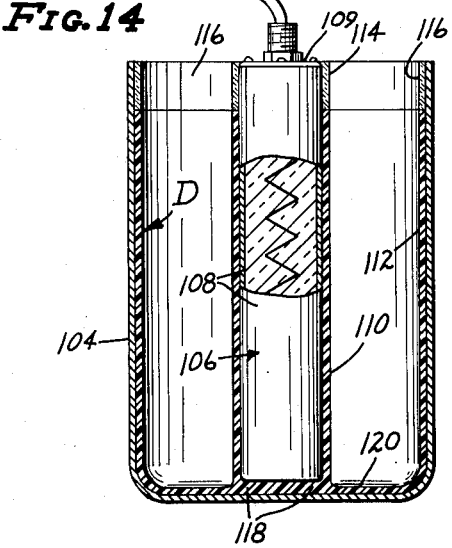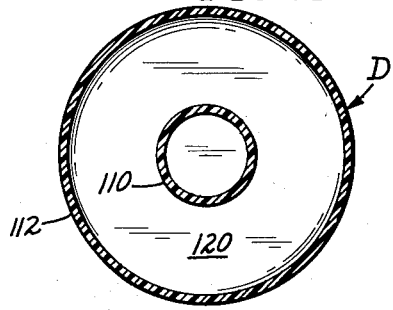

United States Patent Office 3,059,281
Patented Oct. 23, 1962

3,059,281
METHOD OF MAKING A REINFORCED ARTICLE HAVING AN INTERNAL INTEGRAL CONFIGURATION
Gerrit A. Visser, Excelsior, and Paul V. Bollenbacher, Minneapolis, Minn., assignors to Space Structures, Inc., Chanhassen, Minn.
Filed Apr. 18, 1960, Ser. No. 23,044
2 Claims. (Cl. 18—55)

The invention herein disclosed relates to an improvement in self-supporting hollow articles and the formation thereof and, more particularly, to the method of making a container from finely divided thermoplastic material having a configuration therein which is formed simultaneous and integral therewith in one operation.

In the manufacture of tanks for use in water softeners, for example, it is necessary to provide a circulating tube or conduit within the tank which presents a problem in fabrication. In addition, it is desirable that the tank have an inner liner or surface which will not contaminate water contained in the tank.

It is an object of this invention to manufacture a container, for example, having an internal tubular configuration formed with the formation of the container; that is, in one operation and, in addition, which does not have any deleterious effect on the water therein.

The formation of a hollow article from finely divided thermoplastic material with a low cost mold is broadly disclosed in U.S. Patent No. 2,915,788. Polyethylene may be used which is of a broader classification known as polyolefins.

A container made of a polyolefin is inert and, therefore, desirable for containing water, but it does not have enough rigidity relative to its thickness in some cases. It is, therefore, an object of this invention to manufacture a tank including a container-liner formed of a polyolefin; specifically, polyethylene, and having an internal tubular formation formed simultaneously therewith in one operation, the container-liner covered with a layer of fiber glass to reinforce the same. Other forms of internal configurations are also shown as examples of the inventive concept.

It will not be here attempted to set forth and indicate all of the various objects and advantages incident to the invention, but other objects and advantages will be referred to in or else will become apparent from that which follows.

The invention will appear more clearly from the following detailed description when taken in connection with the accompanying drawings, showing by way of example a preferred embodiment of the inventive idea wherein like numerals refer to like parts throughout.

In the drawings forming part of this application:

FIGURE 9 is a vertical section through a mold and a container formed therein with a centrally disposed baffle wall configuration, the heater element being in position with a portion thereof broken away.

FIGURE 10 is a perspective view of the heater element illustrated in FIGURE 9 removed from the mold.

FIGURE 11 is a vertical section through a mold and a container formed therein with a centrally disposed baffle wall configuration, the heater element being in position with a portion thereof broken away.

FIGURE 12 is a perspective view of the heater element illustrated in FIGURE 11 removed from the mold.

FIGURE 13 is a sectional view on the line 13—13 of FIGURE 12.

FIGURE 14 is a vertical section through a mold and a container formed therein with a centrally disposed internal container configuration, the heater element being in position with a portion thereof broken away.

FIGURE 15 is a horizontal section through the container having an internal configuration as formed with the apparatus of FIGURE 14.

Figure 1:
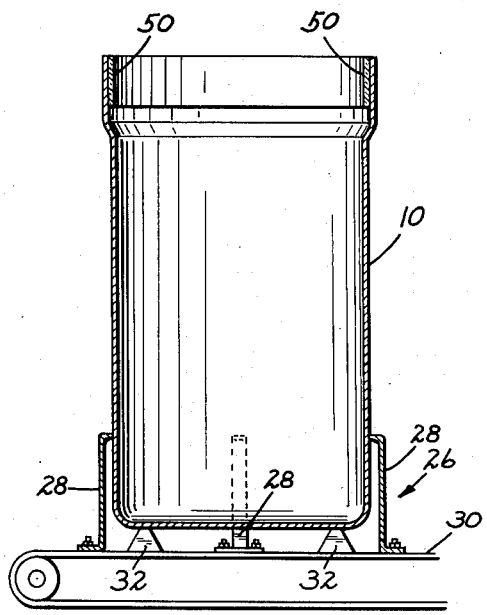
FIGURE 1 is a vertical section of a mold supported in position on a conveyor belt, only a portion of the belt being shown.
Figure 2:
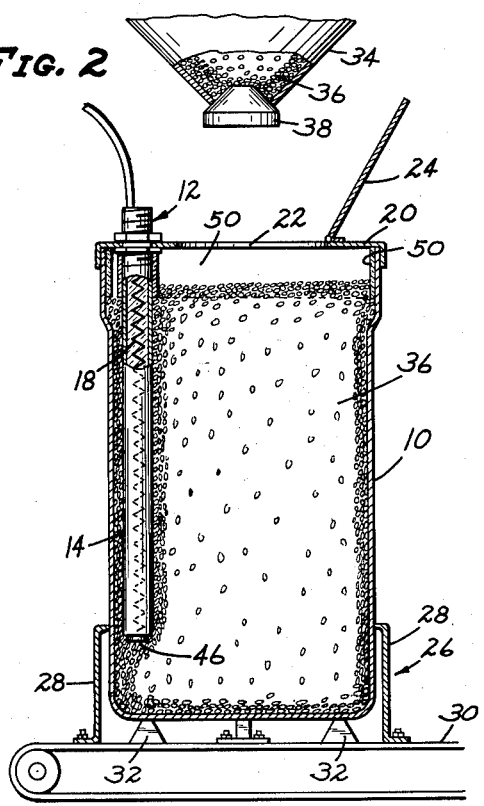
FIGURE 2 is a vertical section through the mold with a heater element substantially in the configuration of the circulating tube desired extending thereinto and the entire mold filled with a powdered polyolefin or the like, a lower portion of the powder supply hopper being shown.
Figure 3:
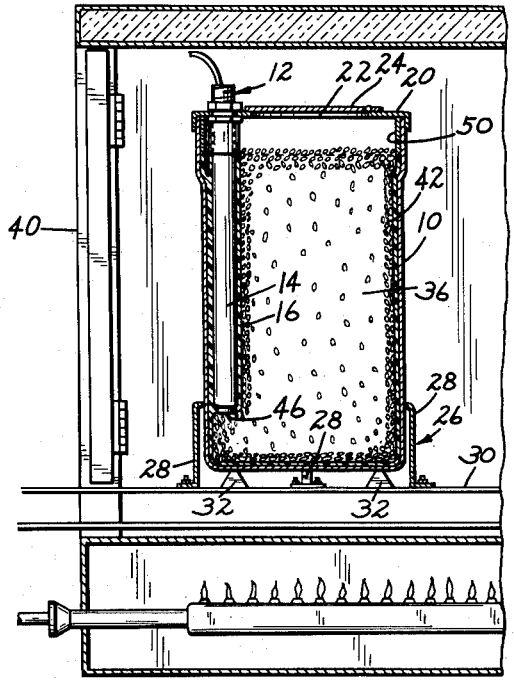
FIGURE 3 is the unit of FIGURE 3 shown in an oven after the same has been heated to fuse the powder, a portion of the oven being broken away.
Figure 3:
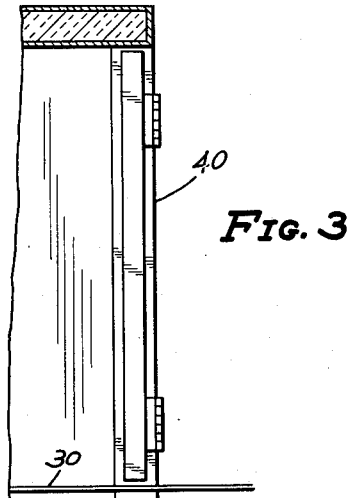
Figure 4:
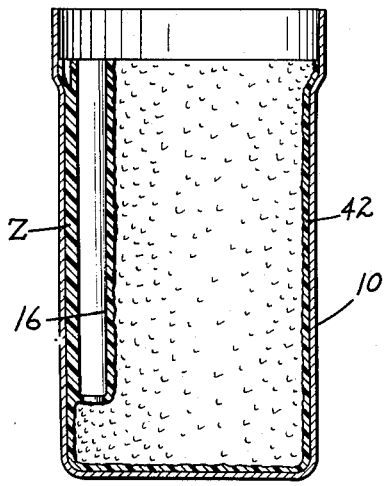
FIGURE 4 is a vertical section through the mold and the container and tube formed therein with the heater element removed, the excess powdered polyolefin also being removed.
Figure 5:
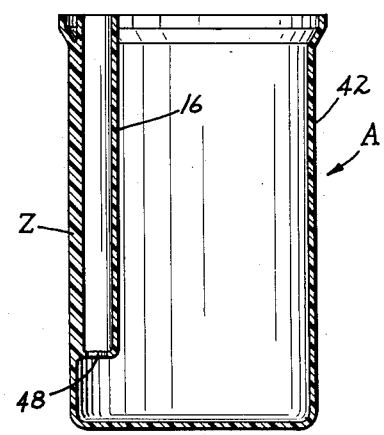
FIGURE 5 is a vertical section through the container after it has been put back in the oven to smooth the inside and removed from the mold.
Figure 7:
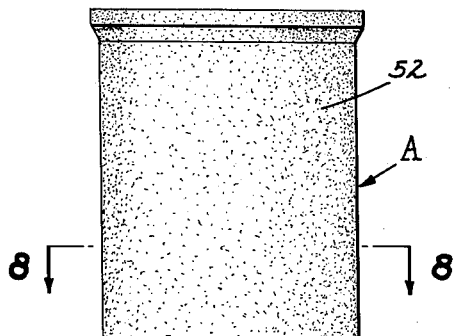
FIGURE 7 is an elevational view of the completed tank.
Figure 6:
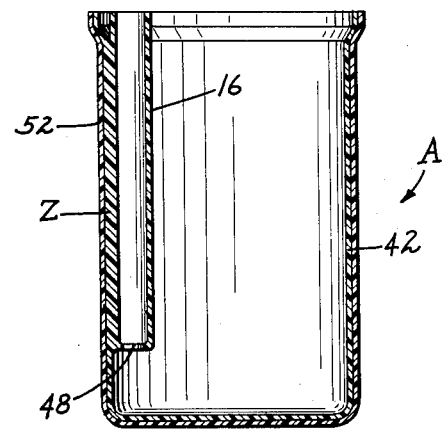
FIGURE 6 is a vertical section through the container with an outer reinforcing layer of fiber glass applied thereto to complete the tank.

Referring to the drawings in detail, the tank A, FIGURES 5–7, is formed by first constructing the low cost mold or receptacle 10 which may be easily formed from relatively light gauge metal, preferably stainless steel. An immersible heater unit 12 is provided which includes the shell 14, the outer configuration of which is substantially that of the inside of the desired tubular formation 16. Mounted in the heater shell 14 is the heating element 18, and the shell 14 is connected to the mold cover 20 which is formed with the opening 22 and the co-operable hinged lid 24. The heater shell 14 is so connected to the mold cover 20 that it extends downwardly into the empty mold adjacent to, but spaced from, the inside of the wall of the mold 10 a distance of approximately one and one-half times the desired wall thickness of the container being formed.

A cradle 26 is provided for the mold 10 which includes the four retainers 28 secured to the traveling conveyor belt 30. The bottom of the mold 10 rests on the supports 32 which may also be secured to the conveyor belt 30.

Further provided is the hopper 34 in which a supply of powdered, finely divided plastic 36, such as polyethylene, is contained. The hopper 34 is positioned over the belt 30 at a point defining the beginning of the operation in the formation of the container, and the hopper is equipped with a valve 38 which is actuated to allow a discharge material 36 by weight equal to the cubical content of the mold.

The valve 38 is opened and the mold filled with the powder completely contacting the entire inner surface of the mold and the outer surface of the heater shell 14 together with the space between the shell and the mold wall. When the mold 10 is full, the belt 30 is moved whereby the filled mold 10 is moved into the oven 40 which is maintained at constant temperature of 970° F., plus or minus 5 degrees.

The temperature of the heater shell 14 is also maintained at the same temperature maintained in the oven 40, and such temperatures are varied depending upon the powdered material used and the thickness desired in the wall of the members formed. If, for example, it is desired that the wall thickness of the tube 16 be of less thickness than the wall of the tank A proper, then the temperature of the heater shell is reduced below that of the temperature in the oven 40. If it is desired to have the wall of the tube thicker the process is reversed.

Figure 8:
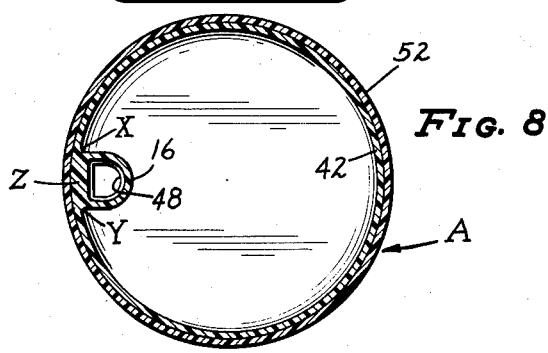
FIGURE 8 is a section on the line 8—8 of FIGURE 7.

The filled mold 10 is held in the oven for a period of time long enough to allow the heat produced by the oven and heater element to penetrate the metal mold 10 and heater shell and coalesce or fuse together the powder 36 adjacent the wall of the mold and shell 14 to thereby form a layer in the form of the container formation 42 within the mold 10 together with the tube portion 16, FIGURES 5 and 8, in particular in one operation. The lower end of the shell 14 of the heater 12 has positioned thereon the insulator pad 46 before the heater is positioned in the empty mold, and, as a result, the heat of the heater does not fuse the powder in the area of the pad, thereby forming the void or lower opening 48 in the tube formation 16. The extent of the upper limit of the container 42 is defined in the formation of the container by the insulator collar 50 positioned in the upper end of the mold 10.

It will be noted, particularly in FIGURES 5 and 8, that the fusing of the powder on the shell 14 and the inside wall of the mold 10 forms an integral tube 16 and wall formation, the two joined at X and Y, which is all done in one operation. The wall portion at the area Z, FIGURE 8, is common to the container 42 and the tubular configuration 16, the same being formed from the heated receptacle 10 and the heat issuing from the shell 14. The same is true at the points X and Y, and such is possible due to the positioning of the shell 14 with respect to the mold 10 as hereinbefore mentioned.

When the powder has been fused sufficiently to form the container 42 and the tube configuration 16 of the desired wall thickness, the mold is removed from the oven and the heater element turned off. The excess powder 36 which is not melted is removed by a pouring or suction process and returned to the hopper 34. At this point in the operation the inside surface of the container 42 and the outer surface of the tube 16 are in a roughened condition. The mold is then moved into a further oven, not shown, and again subjected to heat and, as a result, the inner surface of the container 42 and the outer surface of the tube 16 fuses and is thereby smoothed. The mold and container 42 formed therein are then cooled, and the heater 14 and container 42 removed from the mold 10. The container thus formed is then coated externally with a layer of fiber glass 52 to give the necessary reinforcement and rigidity and thereby produce the completed tank A. While the formation 42 has been referred to as a container, it is essentially a liner with respect to the finished tank A, although in and of itself it is a container. The formation of the container 42 and tubular configuration 16 is shown as one example of the inventive concept.

A further embodiment of the inventive concept is shown in FIGURES 9 and 10 where there is found the mold 54 similar to the mold 10. An immersible heater 56 is provided which includes the shell formation 58 which is substantially the formation of the finished baffle wall 60 desired in the container 62 formed in the mold 54. The length of the shell formation 58 of the heater is such that the exposed end edges 64 and 66 are spaced from the opposed walls 68 of the mold approximately one and one-half times the thickness desired for the wall of the container B. The bottom edge 69 of the heater shell 58 is spaced from the bottom of the mold approximately one and one-half times the thickness desired for the wall of the container B. Such positioning of the heater shell edges with relation to the walls and bottom of the mold assures integral fusing of the formed baffle 60 with the bottom 70 and walls 68 of the container B at the area 72 accomplished by the combined heat of heater 56 at that area and the heat of an oven which penetrates the wall of the mold at that area.

The uppermost limit or height of the baffle wall 56 is defined and determined by the lower edge of the insulator band 74 secured around the shell 58 of the heater 56. The finely divided thermoplastic used to form the container B, as heretofore set forth, does not form at the area of the insulator band. The upper peripheral extent of the container B is determined by the insulator band 76 mounted at the top edge of the mold 54.

In forming the container B, the heater 56 is positioned in the mold as above and the mold 54 is filled with a powdered thermoplastic material. The container is then placed in an oven such as 40 with the heater 56 at substantially the same temperature, depending upon the desired thickness of the wall of the baffle. When the powder has been fused sufficiently at the heater 56 and the walls of the mold to form the container B, the mold is removed from the oven and the heater turned off. The excess powder which is not fused is removed. The mold is then moved to a further oven to thereby smooth the inner surface of the container and the baffle 60. The mold is then cooled and the container and heater removed thereby completing the formation of the container, B. With the heater removed we have the spaced walls 75 and 77 forming the baffle wall 60. The top of the walls may be capped, or the space between may be filled or not.

A further embodiment of the invention is illustrated in FIGURES 11, 12 and 13 where there is found the mold 78 similar to the other molds heretofore mentioned. An immersible heater 80 is provided which includes the flat rectangular shell formation 82 on one side of which is positioned the flat side insulator portion 84. Formed on the other side of the shell formation 82 is the partial side insulator 86 the lower edge 88 of which determines the height of the baffle wall formed. The side insulators 84 and 86 are joined at the ends by end insulator portions 90. The side insulator 84 extends downwardly slightly past the lower end of the heater shell 82 as at 83 for the end of the heater shell must be raised from the bottom of the mold a distance greater than the desired thickness of the wall of the container otherwise the combined heat of the lower end of the heater and that penetrating the mold wall at that area would melt the powder at that area. It will be noted that the side insulator 84 extends outwardly from each end of the heater shell 82 as at 92. The heater shell 82 and insulator portions 84, 86 and 90 are mounted on the cap member 94 from which extends the electrical line 96. The length of the shell 82 is such that when the same is in position within the mold 78, the ends thereof are spaced from the walls approximately one and one-half times the thickness desired in the container wall, and the insulator portion 84 is positioned a distance from the bottom of the mold equal to the thickness desired in the bottom 98 of the container. With the heater 80 in position in the mold 78, the mold is filled with finely divided thermoplastic, which intimately contacts the entire inner surface of the mold and the exposed surface of the heater shell 82. The mold is then placed in an oven such as 40 and heated as hereinbefore described with the heater element 80 also heating.

When the powder has fused or coalesced to the wall thickness desired, the mold 78 is removed and the excess powder removed. The mold is then placed into a further oven and the inside surface of the container C and the baffle wall 100 smoothed thereby as hereinbefore set forth. The mold is then removed from the oven and cooled and the container 78 removed from the mold and the heater 80 removed from the container.

It will be noted that the powder fused adjacent the exposed portion of the heater shell 80 and the area just below it forms the baffle wall 100. The upper limit of the container C is defined in the process by the peripheral insulator collar 102.

A further embodiment of the inventive concept is illustrated in FIGURES 14 and 15 where is found the mold 104 in which is positioned the immersible cylindrical heater element 106 having the outer shell formation 108, the outer surface of which is in the configuration of the desired internal formation of the internal configuration 110 of the container D. The heater shell 108 is connected to the top cap 109.

In forming the container 104 with the internal configuration 110, the heater 106 is positioned within the mold 104 with the bottom of the heater spaced from the bottom of the mold about one and one-half times the desired thickness of the wall of the container D. The mold is then filled with powdered thermoplastic material and heated as heretofore set forth together with the heat from the heater 106. When the powder has fused sufficiently to form the wall thickness desired in the wall 112 of the container D, the excess powder is removed and the container again heated to smooth the inside surface of the container D and the outside surface of the internal configuration 110. The unit is then cooled and the mold and heater removed. The upper limits of the configuration 110 and the outer container portion 112 are defined by the insulator collars 114 and 116, respectively. As a result of the placement of the lower end of the heater 106, we have the integral fused portion as at the area 118 whereby the internal container configuration 110 is integral with the portion 112 at the bottom 120 thereof. Pads of insulative material may be positioned on the surface of any of the heaters shown to thereby form voids or openings in the wall of the internal configurations. Also, pads of insulative material may be positioned on the inside surface of any of the molds shown to thereby form voids or openings in the wall of the container formed by the mold.

The invention is not to be understood as restricted to the details set forth since these may be modified within the scope of the appended claims without departing from the spirit and scope of the invention.

Having thus described the invention, what is claimed as new and desired to be secured by Letters Patent is:

1. The method of making a self-supporting article having an internal, integral, hollow configuration consisting in removably mounting in a hollow receptacle an enclosed heater element the outer formation of which is that of the desired formation of the inner surface of the hollow configuration, a portion of the heater element being closely spaced from the inner surface of the receptacle, then filling the receptacle with a mass of finely divided thermoplastic intimately contacting the entire inner surface of the receptacle and the entire outer surface of the heater element and filling the space between the heater element and the inner surface of the receptacle, then heating the mass through the wall of the receptacle and the wall of the heater to fuse the mass to a coherent layer desired for the article and the hollow configuration, the distance between the heater element and the hollow receptacle being such that the thermoplastic therebetween fuses with the thermoplastic adjacent the heater element and that adjacent the receptacle to form an internal configuration integral with the receptacle then removing the excess mass of finely divided thermoplastic, then cooling the article formed, then removing the heater element and the article formed from the receptacle.

2. The method of making a self-supporting article having a configuration integral therewith consisting in removably mounting in a hollow receptacle an enclosed heater element a portion of, the heater element being closely spaced to the inner surface of the hollow receptacle, then filling the receptacle with a mass of finely divided thermoplastic material intimately contacting the inner surface of the receptacle and the outer surface of the heater element and filling the space between the heater element and the inner surface of the receptacle, then heating the mass through the wall of the receptacle and the wall of the enclosed heater element to fuse the mass to a coherent layer desired for the article, the configuration and provide a connection between the article and the configuration formed in the space between the heater element and the receptacle, then removing the excess mass of finely divided plastic, then removing the heater element and the article formed from the receptacle.

References Cited in the file of this patent

UNITED STATES PATENTS

| | | |
|---|---|---|
| 2,064,162 | Hottel | Dec. 15, 1936 |
| 2,434,780 | Wiss | Jan. 20, 1948 |
| 2,696,642 | Kohrn | Dec. 14, 1954 |
| 2,810,989 | Terry | Oct. 29, 1957 |
| 2,830,325 | Bray | Apr. 15, 1958 |
| 2,915,788 | Engel | Dec. 8, 1959 |